(12) United States Patent
Bentley et al.

(10) Patent No.: US 9,052,201 B2
(45) Date of Patent: Jun. 9, 2015

(54) CALIBRATION SYSTEM FOR SIMULTANEOUS CALIBRATION OF MULTIPLE MOTION CAPTURE ELEMENTS

(75) Inventors: Michael Bentley, Encinitas, CA (US); Bhaskar Bose, Carlsbad, CA (US)

(73) Assignee: BLAST MOTION INC., Burlingame, CA (US)

( * ) Notice: Subject to any disclaimer, the term of this patent is extended or adjusted under 35 U.S.C. 154(b) by 567 days.

(21) Appl. No.: 13/459,059

(22) Filed: Apr. 27, 2012

(65) Prior Publication Data

US 2012/0215474 A1 Aug. 23, 2012

Related U.S. Application Data

(63) Continuation-in-part of application No. 13/358,522, filed on Jan. 26, 2012, now Pat. No. 8,613,676, which is a continuation-in-part of application No. 13/306,869, filed on Nov. 29, 2011, and a (Continued)

(51) Int. Cl.
*G01C 25/00* (2006.01)
*A63B 49/00* (2006.01)
*A63B 53/00* (2006.01)

(52) U.S. Cl.
CPC ............... *G01C 25/005* (2013.01); *A63B 49/00* (2013.01); *A63B 53/00* (2013.01); *A63B 2220/12* (2013.01); *A63B 2225/50* (2013.01); *A63B 2225/54* (2013.01); *A63B 2220/00* (2013.01); *A63B 2225/02* (2013.01)

(58) Field of Classification Search
CPC .......... G06F 3/014; G06F 3/03; G01C 25/005

USPC ...................................................... 702/92–94
See application file for complete search history.

(56) References Cited

U.S. PATENT DOCUMENTS

| 4,898,389 A | 2/1990 | Plutt |
| 4,910,677 A | 3/1990 | Remedio et al. |

(Continued)

FOREIGN PATENT DOCUMENTS

| CA | 2694123 A1 | 8/2011 |
| KR | 20070120443 A | 5/2008 |

OTHER PUBLICATIONS

IPRP, PCT/US2013/038694, dated Nov. 6, 2014, 5 pages.

(Continued)

*Primary Examiner* — Phuong Huynh
(74) *Attorney, Agent, or Firm* — ARC IP Law, PC; Joseph J. Mayo

(57) ABSTRACT

A calibration system for simultaneous calibration of multiple motion capture elements (MCEs) of at least one type (accelerometer and/or gyroscope). Includes motion and/or rotational element coupled to a base and configured to move and/or rotate multiple MCEs mounted on a mount in and/or about at least one axis. For one axis movement embodiments, after each motion and/or axial rotation, the motion and/or rotational mount itself is rotated for example manually, so the mount points in a different direction, i.e., the Z axis. In a single axis embodiment, this is performed twice so that each axis of the MCEs experience motion and/or rotation about three axes. The motion capture data is sampled and used in calculation of a 3×3 calibration matrix. The physical format of the motion capture sensors may be any format including chip, memory or SIM card format, PCB format, mobile computers/phones.

20 Claims, 5 Drawing Sheets

Related U.S. Application Data continuation-in-part of application No. 13/351,429, filed on Jan. 17, 2012, now Pat. No. 8,903,521, which is a continuation-in-part of application No. 13/298,158, filed on Nov. 16, 2011, now Pat. No. 8,905,855, which is a continuation-in-part of application No. 13/267,784, filed on Oct. 6, 2011, which is a continuation-in-part of application No. 13/219,525, filed on Aug. 26, 2011, now Pat. No. 8,941,723, which is a continuation-in-part of application No. 13/191,309, filed on Jul. 26, 2011, which is a continuation-in-part of application No. 13/048,850, filed on Mar. 15, 2011, now Pat. No. 8,465,376, which is a continuation-in-part of application No. 12/901,806, filed on Oct. 11, 2010, which is a continuation-in-part of application No. 12/868,882, filed on Aug. 26, 2010.

(56) References Cited

U.S. PATENT DOCUMENTS

| | | | |
|---|---|---|---|
| 4,940,236 | A | 7/1990 | Allen |
| 5,086,390 | A | 2/1992 | Matthews |
| 5,127,044 | A | 6/1992 | Bonito et al. |
| 5,230,512 | A | 7/1993 | Tattershall |
| 5,283,733 | A | 2/1994 | Colley |
| 5,298,904 | A | 3/1994 | Olich |
| 5,364,093 | A | 11/1994 | Huston et al. |
| 5,372,365 | A | 12/1994 | McTeigue et al. |
| 5,441,269 | A | 8/1995 | Henwood |
| 5,486,001 | A | 1/1996 | Baker |
| 5,524,081 | A | 6/1996 | Paul |
| 5,792,001 | A | 8/1998 | Henwood |
| 5,819,206 | A | 10/1998 | Horton |
| 5,973,596 | A | 10/1999 | French et al. |
| 6,030,109 | A | 2/2000 | Lobsenz |
| 6,248,021 | B1 | 6/2001 | Ognjanovic |
| 6,456,938 | B1 | 9/2002 | Barnard |
| 6,582,328 | B2 | 6/2003 | Kuta et al. |
| 6,697,820 | B1 | 2/2004 | Tarlie |
| 6,705,942 | B1 | 3/2004 | Crook et al. |
| 6,757,572 | B1 | 6/2004 | Forest |
| 6,802,772 | B1 | 10/2004 | Kunzle et al. |
| 6,900,759 | B1 | 5/2005 | Katayama |
| 6,908,404 | B1 | 6/2005 | Gard |
| 6,923,729 | B2 | 8/2005 | McGinty et al. |
| 7,004,848 | B2 | 2/2006 | Konow |
| 7,021,140 | B2 | 4/2006 | Perkins |
| 7,037,198 | B2 | 5/2006 | Hameen-Anttila |
| 7,118,498 | B2 | 10/2006 | Meadows et al. |
| 7,121,962 | B2 | 10/2006 | Reeves |
| 7,143,639 | B2 | 12/2006 | Gobush |
| 7,160,200 | B2 | 1/2007 | Grober |
| 7,175,177 | B2 | 2/2007 | Meifu et al. |
| 7,234,351 | B2 | 6/2007 | Perkins |
| 7,457,439 | B1 | 11/2008 | Madsen |
| 7,689,378 | B2 | 3/2010 | Kolen |
| 8,117,888 | B2 | 2/2012 | Chan et al. |
| 8,257,191 | B2 | 9/2012 | Stites et al. |
| 8,355,529 | B2 | 1/2013 | Wu et al. |
| 8,425,292 | B2 | 4/2013 | Lui et al. |
| 2001/0035880 | A1 | 11/2001 | Musatov et al. |
| 2001/0045904 | A1 | 11/2001 | Silzer, Jr. |
| 2002/0004723 | A1 | 1/2002 | Meifu et al. |
| 2002/0019677 | A1 | 2/2002 | Lee |
| 2002/0049507 | A1 | 4/2002 | Hameen-Anttila |
| 2002/0052750 | A1 | 5/2002 | Hirooka |
| 2002/0072815 | A1 | 6/2002 | McDonough et al. |
| 2002/0082775 | A1 | 6/2002 | Meadows et al. |
| 2002/0151994 | A1 | 10/2002 | Sisco |
| 2002/0173364 | A1 | 11/2002 | Boscha |
| 2002/0177490 | A1 | 11/2002 | Yong et al. |
| 2002/0188359 | A1 | 12/2002 | Morse |
| 2003/0008722 | A1 | 1/2003 | Konow |
| 2004/0147329 | A1 | 7/2004 | Meadows et al. |
| 2005/0215340 | A1 | 9/2005 | Stites et al. |
| 2005/0261073 | A1 | 11/2005 | Farrington, Jr. et al. |
| 2005/0268704 | A1 | 12/2005 | Bissonnette et al. |
| 2005/0272516 | A1 | 12/2005 | Gobush |
| 2005/0282650 | A1 | 12/2005 | Miettinen et al. |
| 2006/0063600 | A1 | 3/2006 | Grober |
| 2006/0084516 | A1 | 4/2006 | Eyestone et al. |
| 2006/0109116 | A1 | 5/2006 | Keays |
| 2006/0122002 | A1 | 6/2006 | Konow |
| 2006/0199659 | A1 | 9/2006 | Caldwell |
| 2006/0270450 | A1 | 11/2006 | Garratt et al. |
| 2006/0276256 | A1 | 12/2006 | Storek |
| 2007/0087866 | A1 | 4/2007 | Meadows et al. |
| 2007/0111811 | A1 | 5/2007 | Grober |
| 2007/0129178 | A1 | 6/2007 | Reeves |
| 2007/0135225 | A1 | 6/2007 | Nieminen |
| 2007/0135237 | A1 | 6/2007 | Reeves |
| 2007/0270214 | A1 | 11/2007 | Bentley |
| 2007/0298896 | A1 | 12/2007 | Nusbaum |
| 2009/0111602 | A1 | 4/2009 | Savarese et al. |
| 2009/0177097 | A1 | 7/2009 | Ma et al. |
| 2009/0209358 | A1 | 8/2009 | Niegowski |
| 2010/0049468 | A1 | 2/2010 | Papadourakis |
| 2010/0063778 | A1 | 3/2010 | Schrock et al. |
| 2010/0063779 | A1 | 3/2010 | Schrock et al. |
| 2010/0130298 | A1 | 5/2010 | Dugan et al. |
| 2010/0216564 | A1 | 8/2010 | Stites et al. |
| 2010/0222152 | A1 | 9/2010 | Jaekel et al. |
| 2011/0037778 | A1 | 2/2011 | Deng et al. |
| 2011/0075341 | A1 | 3/2011 | Lau et al. |
| 2011/0165998 | A1 | 7/2011 | Lau et al. |
| 2011/0230273 | A1 | 9/2011 | Niegowski et al. |
| 2011/0230274 | A1 | 9/2011 | Lafortune et al. |
| 2011/0230985 | A1 | 9/2011 | Niegowski et al. |
| 2011/0230986 | A1 | 9/2011 | Lafortune |

OTHER PUBLICATIONS miCoach Speed_Cell TM, User Manual, 23 pages.
Nike+iPod, User Guide, 32 pages.
SureShotGPS SS9000X, Intelligent Touch, Instruction Manual, 25 pages.
myCaddie, 2009, retrieved on Sep. 26, 2012 from http://www.iMakePars.com, 4 pages.
Swing it See it Fix it, Improve Gold Swing, SwingSmart Golf Analyzer, retrieved on Sep. 26, 2012 from http://wvvvv.SwingSmart.com, 2 pages.
Learn how Swingbyte can improve your game, retrieved on Sep. 26, 2012 from http://www.swingbyte.com, 2 pages.

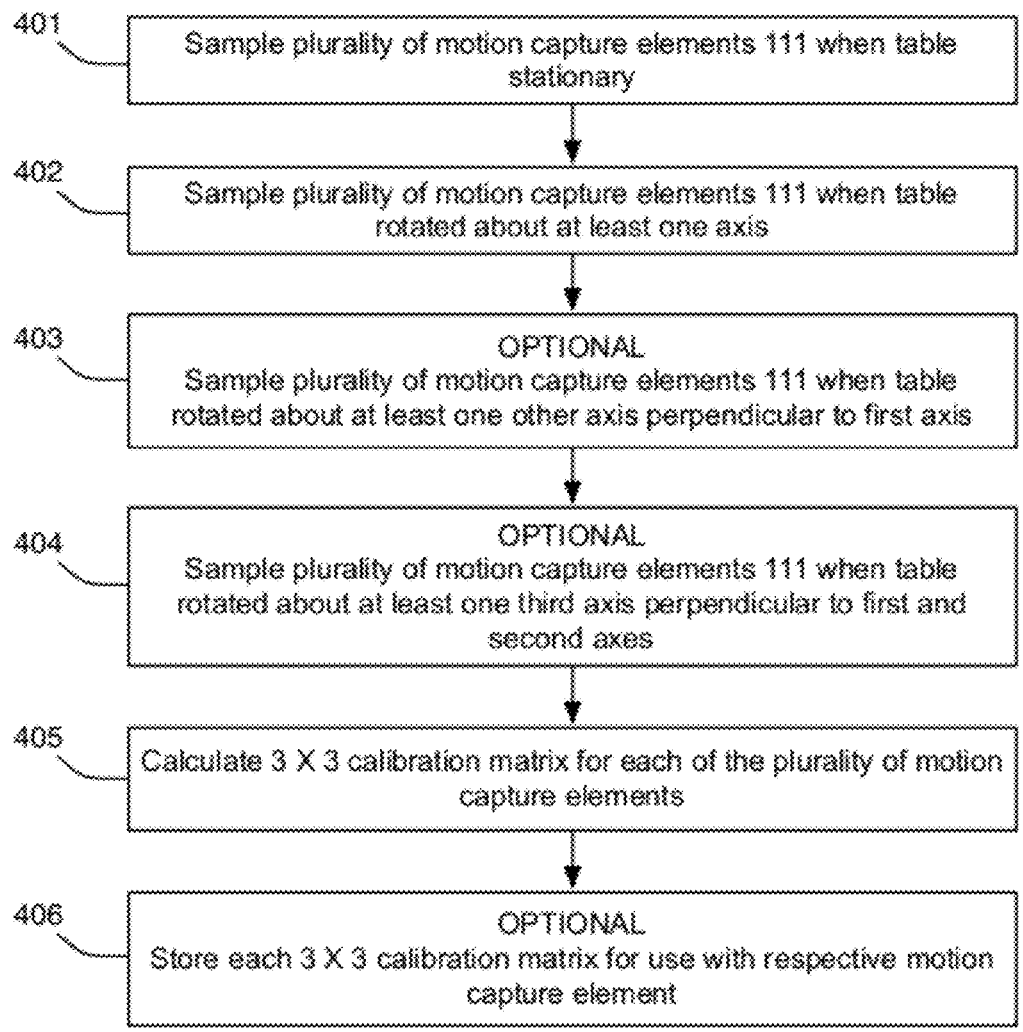

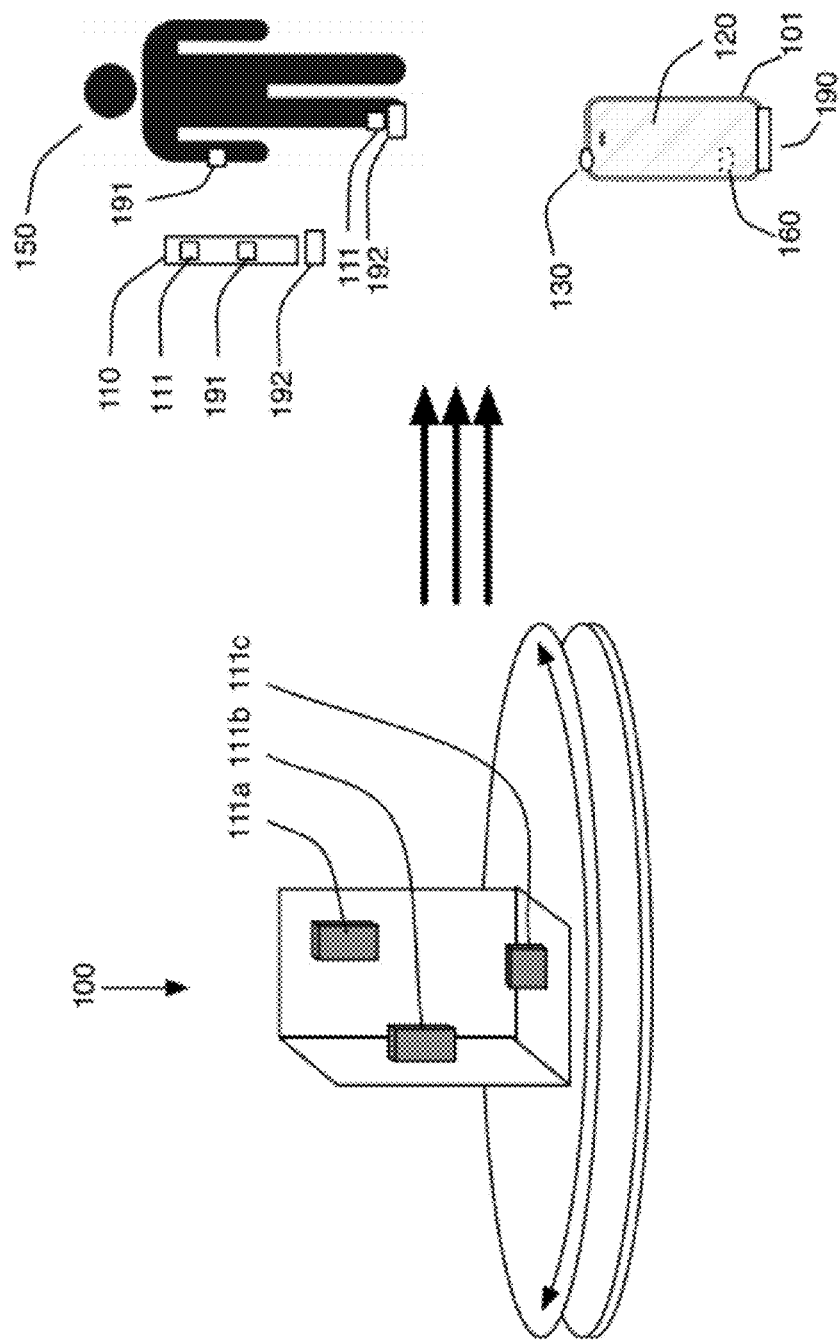

CALIBRATION SYSTEM FOR SIMULTANEOUS CALIBRATION OF MULTIPLE MOTION CAPTURE ELEMENTS

This application is a continuation-in-part of U.S. Utility patent application Ser. No. 13/358,522, issued as U.S. Pat. No. 8,613,676, filed 26 Jan. 2012, which is a continuation-in-part of U.S Utility patent application Ser. No. 13/306,869 filed 29 Nov. 2011, and is also a continuation-in-part of U.S. Utility patent application Ser. No. 13/351,429, issued as U.S. Pat. No. 8,903,521, filed 17 Jan. 2012, which is a continuation-in-part of U.S. Utility patent application Ser. No. 13/298,158, issued as U.S. Pat. No. 8,905,855, filed 16 Nov. 2011, which is a continuation-in-part of U.S. Utility patent application Ser. No. 13/267,784 filed 6 Oct. 2011, which is a continuation-in-part of U.S. Utility patent application Ser. No. 13/219,525, issued as U.S. Pat. No. 8,941,723, filed 26 Aug. 2011, which is a continuation-in-part of U.S. Utility patent application Ser. No. 13/191,309 filed 26 Jul. 2011, which is a continuation-in-part of U.S. Utility patent application Ser. No. 13/048,850, issued as U.S. Pat. No. 8,465,376, filed 15 Mar. 2011, which is a continuation-in-part of U.S. Utility patent application Ser. No. 12/901,806 filed 11 Oct. 2010, which is a continuation-in-part of U.S. Utility patent application Ser. No. 12/868,882, issued as U.S. Pat. No. 8,994,826, filed 26 Aug. 2010, the specifications of which are all hereby incorporated herein by reference.

BACKGROUND OF THE INVENTION

1. Field of the Invention

One or more embodiments setting forth the ideas described throughout this disclosure pertain to the field of calibration of sensor electronics, for example simultaneous calibration of multiple motion capture sensors that produce motion capture data. More particularly, but not by way of limitation, one or more aspects of the disclosure enable more than one or large numbers of motion capture elements having a diverse array of physical formats to be simultaneously calibrated using an embodiment of the invention.

2. Description of the Related Art

Motion capture elements enable digital capture of motion, generally through use of accelerometers and gyroscopes for example. The use of motion capture elements for various activities is increasing as the size of the devices decreases and the price of available solutions decreases. Motion capture elements are commercially available in very small physical formats such as microelectromechanical (MEMS) format. These types of sensors are also lightweight and are available on small memory card formats or other mounting types.

Although the use of accelerometers and gyroscopes is increasing, the general accuracy of known motion capture sensors or elements is limited for a variety of reasons. One reason for the limited accuracy of accelerometers and gyroscopes is that there is a cost associated with calibrating each device. Many manufactures skip this step since the base accuracy is good enough for simple applications, such as a cell phones or game controllers that makes use of accelerometers wherein high accuracy is not really required for available applications. Another limitation of known motion capture sensors occurs as a result of the mounting process when the motion capture discrete components are coupled with a mounting element. For example, when coupling a chip-based sensor to a printed circuit board, the temperature changes inherent in the manufacturing process may rise considerably, which changes the characteristics of the sensor, requiring further calibration. In addition, the exact orientation of the chip with respect to the PCB varies during the manufacturing process. To summarize, motion capture data is generally not calibrated in known devices to provide high accuracy due to manufacturing techniques and extra costs involved with calibration.

In systems that actually calibrate a motion capture element, a single motion capture element is generally mounted on a moveable table and rotated at a known rate for example. The motion capture data from the motion capture element is analyzed and a calibration factor for each axis of rotation and optionally acceleration is thus determined. Some devices, such as mobile phones may include motion capture elements on relatively large PCB's that are generally not calibrated for highly accurate motion capture. This is due to the size of the PCB's that are relatively large and can only be calibrated one at a time with known calibration machines.

To provide highly accurate motion capture data for high volume electronics device, there is thus a need for a calibration system for simultaneous calibration of multiple motion capture elements.

BRIEF SUMMARY OF THE INVENTION

Embodiments of the invention enable a calibration system for simultaneous calibration of multiple motion capture elements. More than one or large numbers of motion capture sensors may be calibrated simultaneously which reduces the cost and increases the accuracy of motion capture elements. The calibrated motion capture elements may be utilized in a myriad of applications to provide more accurate motion capture data, including but not limited to healthcare compliance, sporting, gaming, military, fire, police, virtual reality, industrial, retail loss tracking, security, baby and elderly monitoring and other applications. The motion capture data may be obtained from one or more users and/or instrumented pieces of sporting equipment. Embodiments of the invention may communicate with the motion capture elements during calibration via hardwired or wireless communications depending on the communications capabilities of the specific motion capture elements. The formats of motion capture elements that may be calibrated in one or more embodiments of the invention include all types of integrated circuits, memory cards with integrated gyroscopes and/or accelerometers, including but not limited to secure digital (SD) cards, subscriber identity module (SIM) cards, printed circuit boards (PCBs) or any type of mobile device or any other device having an accelerometer and/or gyroscope for example. One or more embodiments of the mobile devices that may include accelerometers and for example a small mountable computer include IPHONE® and other cell phones, an IPOD® SHUFFLE® or IPOD® NANO® that may or may not have integrated displays, and which are small enough to couple with a human or mount on a shaft of a piece of sporting equipment.

Embodiments of the invention may utilize a calibrated rotational plate or sensor mount or Stewart platform or HEXAPOD® or any other device that may rotate for example. In one or more embodiments of the invention, the sensor mount is configured to couple with two or more motion capture sensors simultaneously and obtain motion capture data without motion, and also with known motion and/or rotation in each of three axes. In one or more embodiments the two or more motion capture sensors are sampled for motion capture data with no motion and then sampled at a known motion and/or rotation in or around one axis after which the two or more motion capture sensors are moved/rotated in or around an orthogonal axis and rotated again at a known acceleration and/or angular rate after which the two or more motion capture sensors are rotated to an axis orthogonal to the two other orientations and the two or more capture sensors are moved and/or rotated again at a known acceleration and/or angular rate. In this manner, at least one 3×3 calibration matrix is calculated for each of the two or more motion capture sensors and stored for later use with respect to each motion capture sensor.

BRIEF DESCRIPTION OF THE DRAWINGS

The above and other aspects, features and advantages of the ideas conveyed through this disclosure will be more apparent from the following more particular description thereof, presented in conjunction with the following drawings wherein:

FIG. 4 illustrates a flowchart for the process of simultaneous calibration of multiple motion capture elements.

FIG. 5 illustrates some of the devices that may utilize motion capture sensors calibrated by embodiments of the invention.

DETAILED DESCRIPTION OF THE INVENTION

A calibration system for simultaneous calibration of multiple motion capture elements will now be described. In the following exemplary description numerous specific details are set forth in order to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

Figure 1:
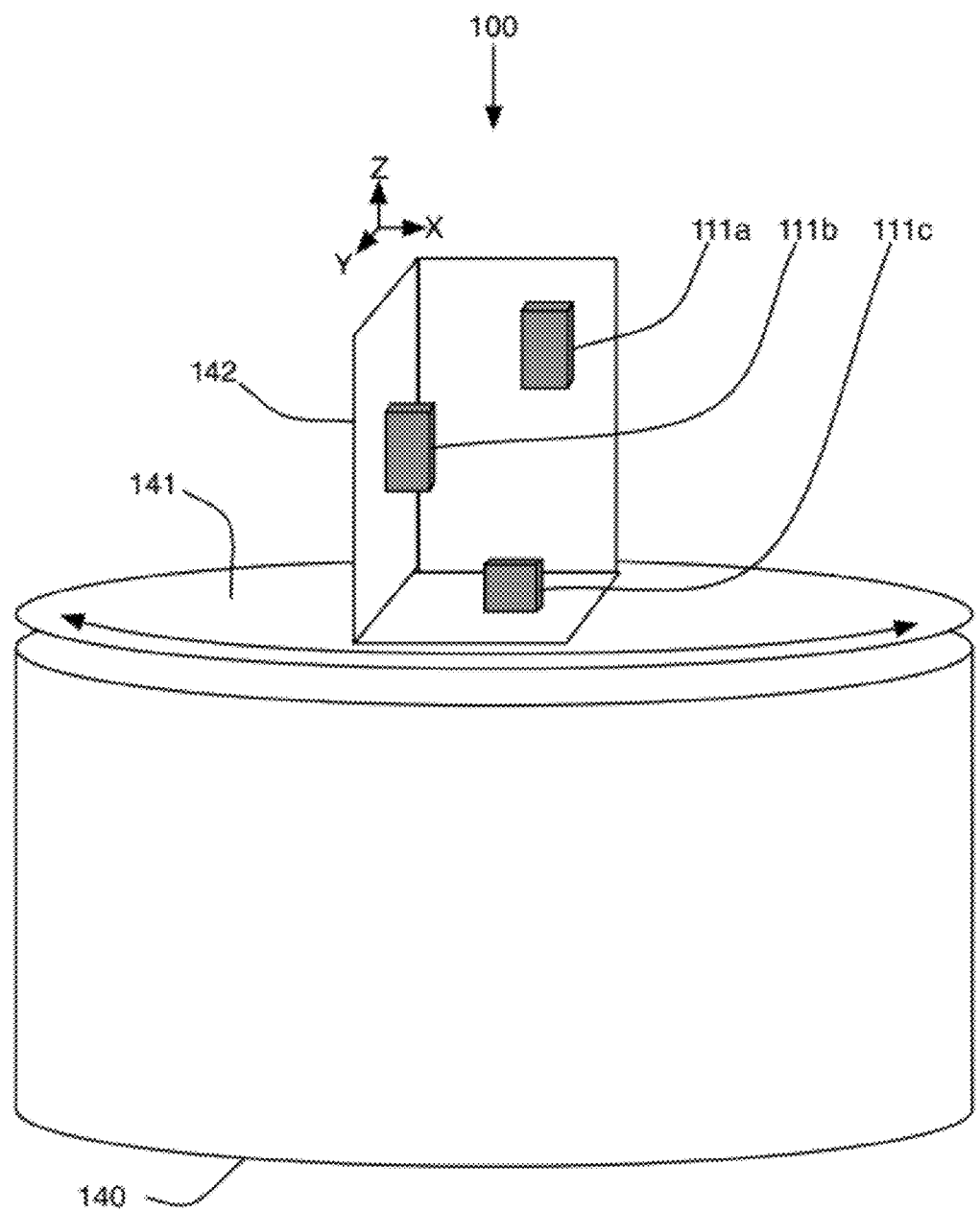
FIG. 1 illustrates an embodiment of the calibration system for simultaneous calibration of multiple motion capture elements.

FIG. 1 illustrates an embodiment of the calibration system for simultaneous calibration of multiple motion capture elements. In one or more embodiments, motion and/or rotational element 141, for example moveably and/or rotationally mounted with respect to base 140 is configured to move and/or rotate multiple motion capture sensors 111a, 111b and 111c mounted on mount 142 in and/or about at least the Z axis. In one or more embodiments, motion and/or rotational element 141 may be a single, dual or tri-axial movement device that moves and/or rotates about the Z axis only, or about two axes, or three axes simultaneously or sequentially in time. In embodiments of the motion and/or rotational element 141 that moves in the direction of the Z axis or about the Z axis, as shown by the arrow near the outer forward edge of rotational element 141, after each motion and/or axial rotation, the motion and/or rotational mount 142 itself is rotated for example manually, so that a different portion of the mount points in the Z axis direction. In a single axis embodiment, this is performed twice so that each axis of the motion capture sensors 111a, 111b and 111c experiences motion and/or rotation in or about all three orthogonal axes, namely X, Y and Z.

In one or more embodiments of the invention, X, Y and Z with respect to the mount need not be exactly orthogonal and may include rotation about another axis as well, so long as that motion is accounted for in calculation of the 3×3 calibration matrix. In one or more embodiments of the invention, a three axis calibrated mount 142 may be utilized to provide for motion and/or rotation to up to three axes simultaneously if desired. The physical format of the motion capture sensors 111a, 111b and 111c may be any format including chip, memory or SIM card format, PCB format, mobile phones, or any other physical format whatsoever without limit, as long as mount 142 is configured large enough to hold multiple devices as many devices as desired.

Figure 2:
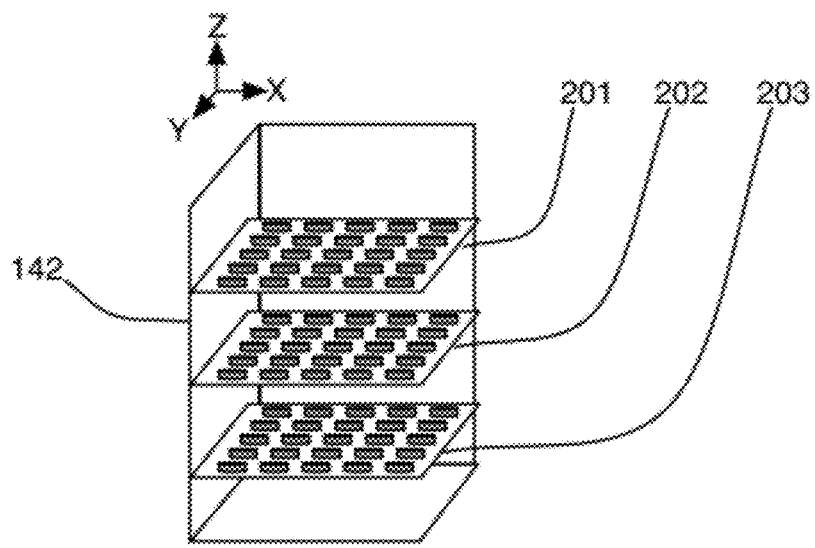
FIG. 2 illustrates an embodiment of the mount that holds multiple motion capture elements for simultaneous calibration.
Figure 2:
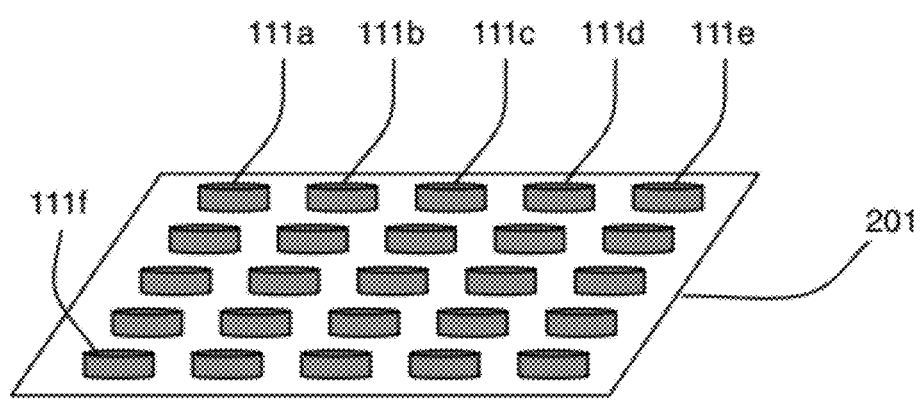

FIG. 2 illustrates an embodiment of the mount that holds multiple motion capture elements for simultaneous calibration. As shown, three 5×5 arrays of motion capture sensors on trays 201, 202 and 203 are coupled with mount 142 to enable 75 devices to be calibrated simultaneously. There is no limit to the number of trays or number of devices per tray, the exemplary values above and as shown in FIG. 2 are for illustration purposes only. As shown in the bottom portion of the figure, one of the trays may include motion capture elements 111a-e in any geometry, for example rows, and motion capture element 111f in a column format for example. There is no requirement for a square, rectangular or any other geometry so long as multiple motion capture sensors or elements may be calibrated at the same time or with the same mount.

Figure 3:
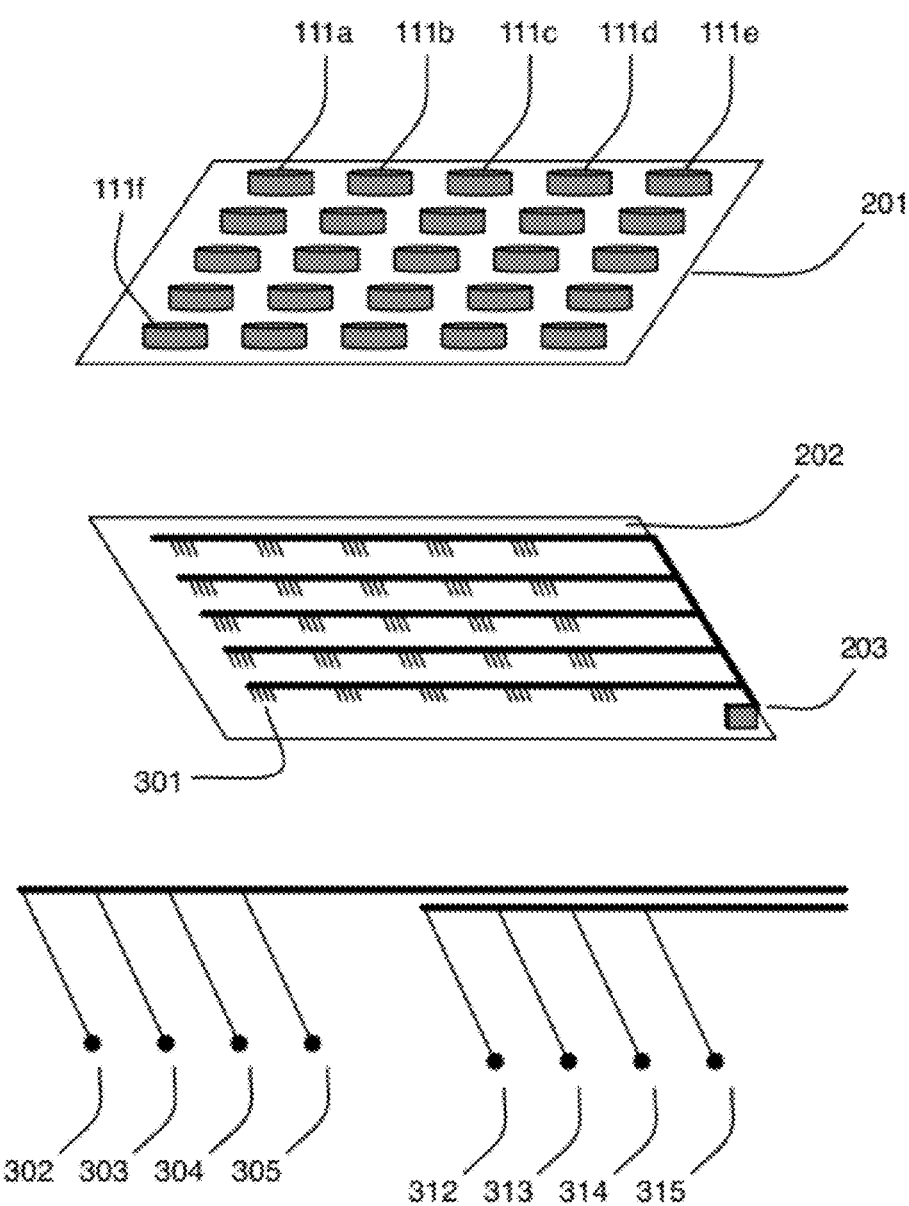
FIG. 3 illustrates a wiring diagram of the bottom portion of a tray that fits in the mount of FIG. 2.

FIG. 3 illustrates a wiring diagram of the bottom portion 202 (shown in the middle of the figure) of the tray 201 (shown at the top of the figure). The bottom portion in one or more embodiments may be utilized to provide power and control and data lines for example to and from each motion capture element. There is no requirement that the bottom portion provide the electrical connections and in one or more embodiments, the top portion may be configured with these electrical connections, or the electrical connections may be configured on both the top and bottom portion of any mount or tray for example described herein. In other embodiments, one or more of the control and/or data signals for example may be wirelessly transmitted or stored locally in each device for example for external or internal calculation of the calibration matrix depending on the specific devices being calibrated. In one or more embodiments, an application may be run on the device, for example an IPHONE® that senses movement in the various axes and performs calibration local to the device. In other motion capture elements that do not contain local functionality for calculations, any type of communications technology may be utilized to command the motion capture sensors to provide sensor data for example. As shown, in one embodiment of the invention, processing element 203 may perform calibration on a tray-by-tray basis. In other embodiments, not shown for brevity, a single computational or multi-computational element may couple to all trays and hence all motion capture sensors to calculate a 3×3 calibration matrix for each device for acceleration and a 3×3 calibration matrix for rotation or either or both. For wired embodiments, each motion capture element couples with a tray via connector 301. Shown in the bottommost portion of the figure is a close up of the electrical connections 302, 303, 304 and 305 that couple with a first motion capture element and electrical connections 312, 313, 314 and 315 that couple with a second motion capture element. In one or more embodiments, the electrical connections may include power, for example voltage and ground, and may provide for a communications line and associated ground. There is no requirement as to the number and types of connectors as they are motion capture element specific generally, so any number of any type may be utilized in keeping with the spirit of the invention.

FIG. 4 illustrates a flowchart for the process of simultaneous calibration of multiple motion capture elements. As shown, the multiple motion capture elements 111 are sampled for motion capture data when motion and/or rotational element 141 or table or tray is stationary at 401. This provides values for each motion capture element for all axes for zero degree per second rotation. This may be performed between other steps or initially for example and the order of any of the steps shown in FIG. 4 is exemplary only. The table is rotated at 402 in at least one axis and the data is sampled from each motion capture element. If the rotational element is a three axes motion device, then steps 403 and 404 are not performed since calibrated motion in all axes has occurred and sampled for each device. In this case, the 3×3 calibration matrix is calculated at 405 and optionally stored at 406 for use with each respective device. In the case where the rotation element 141 rotates for example about the Z axis, then mount 142 is rotated, for example manually so that a different axis points up in the Z direction and the data is sample during rotation at 403. This is repeated at 404 wherein each motion capture element is thus oriented for rotation about a third axis, generally orthogonal to the first two axes. Calculation of the 3×3 calibration matrix is thus performed at 405 and the matrix is stored for use with each respective motion capture element at 406. In one or more embodiments a zero rate vector may also be stored and saved, or alternatively a 4×3 calibration matrix that includes zero rate offsets may be stored. This enables a table capable of motion in or about only one axis to perform 3 axis calibration for example.

The 3×3 calibration matrix is used for example with sporting equipment, wherein the 3×3 calibration matrix is applied to sampled data to derive the true angular rates. Calibration may occur again or be modified at a later time, for example during use of a piece of instrumented sporting equipment as follows. A zero rate measurement of all three gryoscopes on each device is performed at any time, for example when the measurements fall below a threshold, and for example zero rate motion can be assumed. At that time, another zero rate measurement may be taken and utilized to update or replace or in any other manner modify the 3×3 calibration matrix. This can be utilized to account for temperature differences that occur during use of the motion device for example. In one or more embodiments the calibration takes a number of samples with each axis of the devices pointed up at a particular sampling rate and utilizes least squares to obtain the 3×3 calibration matrix. Any other technique of converting measured rates to calibrated angular rates in 3 axes is in keeping with the spirit of the invention. One or more embodiments for example may obtain multiple measurements at different positive and negative sampling rates with each axis pointing up for example for potentially more accurate calibration, wherein the tradeoff is a longer calibration time. In one or more embodiments the matrix Reference Rates (n reference rates of angular rotation in x, y and z for example after flipping the table twice so that all 3 axes are sampled)=matrix Samples (n samples of angular motion for x, y and z and a unit value of 1)*Calibration (3×3 and an additional row for zero offset parameters), which is written as:

$$RR_{n \times 3} = S_{n \times 4} * C_{4 \times 3}$$

and hence $$C = [S^T * S]^{-1} * S^T * RR$$

multiplying the incoming samples by C creates calibrated rotation rates about X, Y and Z axes. Alternatively, C may be constructed as a 3×3 matrix and zero rates subtracted from the samples before the multiplication as one skilled in the art will recognize. Any other method or computing element configured to calculate and utilize references samples and samples obtained at those reference rates to generate a calibration matrix is in keeping with the spirit of the invention.

Analogous processing may be accomplished for acceleration by simply accelerating in the Z axis and then rotating the trays in another axis and repeating again.

In one or more embodiments motion capture may take place for two or more sensor types simultaneously. For example, motion element 141 may accelerate up in the Z axis while rotating about the Z axis to calibrate accelerometers and gyroscopes in the motion capture element simultaneously. As one skilled in the art will appreciate, it is possible to also calibrate acceleration and angular rotation simultaneously by knowing the radius from the center of rotation, i.e., using the well known formula Force=mass*radius*angular velocity squared, or $F=mr\omega^2$.

FIG. 5 illustrates some of the devices that may utilize motion capture sensors calibrated by embodiments of the invention. User 150 may couple with motion capture element 111 via mount 192 and optional wear an RFID tag 191. User 150 may also utilize a piece of equipment 110 having another motion capture element 111, RFID tag 191 and mount 192 respectively. Mobile computer 101 may include camera 130, and include computer 160, shown as located internally in mobile device 101 as a dotted outline, display 120 coupled to computer 160 and a wireless communications interface 190 coupled with the computer. Since mobile phones having mobile computers are ubiquitous, users of the system may purchase one or more motion capture elements and an application, a.k.a., "app", that they install on their pre-existing phone to implement a motion capture method. Motion capture capabilities are thus available at an affordable price for any user that already owns a mobile phone, tablet computer, music player, etc., which has never been possible before.

While the ideas herein disclosed has been described by means of specific embodiments and applications thereof, numerous modifications and variations could be made thereto by those skilled in the art without departing from the scope of the invention set forth in the claims.

What is claimed is:

1. A calibration system for simultaneous calibration of multiple motion capture elements comprising:
   a motion element;
   a base coupled with said motion element wherein said motion element is configured to move in relation to said base;
   a mount coupled with said motion element and configured to hold a plurality of motion capture elements that comprise at least one sensor configured to capture any combination of one or more values associated with an orientation, position, velocity, acceleration of said plurality of motion capture elements;
   a computer configured to
      sample motion from said plurality of motion capture elements when said mount is moved in or about or in and about at least one axis;
      calculate a calibration matrix for each of said plurality of motion capture elements to convert three axes motion capture data into calibrated motion capture data.

2. The system of claim 1 wherein said motion is translational.

3. The system of claim 1 wherein said motion is rotational.

4. The system of claim 1 wherein said motion element is configured to rotate about a single axis only.

5. The system of claim 1 wherein said motion element is configured to rotate about two axes.

6. The system of claim 1 wherein said motion element is configured to rotate about three axes.

7. The system of claim 1 wherein said motion element is configured to move in a single axis.

8. The system of claim 1 wherein said motion element is configured to move in two axes.

9. The system of claim 1 wherein said motion element is configured to move in three axes.

10. The system of claim 1 wherein said motion element is configured to rotate about and move in a single axis.

11. The system of claim 1 wherein said motion element is configured to rotate about and move in at least two axes.

12. The system of claim 1 wherein said computer is further configured to sample motion from said plurality of motion capture elements when said mount is moved in or about or in and about a second axis substantially orthogonal to said at least one axis.

13. The system of claim 12 wherein said computer is further configured to sample motion from said plurality of motion capture elements when said mount is moved in or about or in and about a third axis substantially orthogonal to said at least one axis and said second axis.

14. The system of claim 1 wherein said mount comprises at least one electrical connection coupled with said mount configured to couple with a motion capture element of said plurality of motion capture elements.

15. The system of claim 1 wherein said mount comprises at least one electrical connection coupled with said mount configured to couple with an integrated circuit and wherein said plurality of motion capture elements are in respective integrated circuits.

16. The system of claim 1 wherein said mount comprises at least one electrical connection coupled with said mount configured to couple with an SD or SIM card and wherein said plurality of motion capture elements are SD or SIM cards.

17. The system of claim 1 wherein said mount comprises at least one electrical connection coupled with said mount configured to couple with a mobile computer or mobile phone and wherein said plurality of motion capture elements reside in respective mobile computers or mobile phones.

18. The system of claim 1 wherein said computer is further configured to store said calibration matrix.

19. A calibration system for simultaneous calibration of multiple motion capture elements comprising:
    a motion element;
    a base coupled with said motion element wherein said motion element is configured to move in relation to said base;
    a mount coupled with said motion element and configured to hold a plurality of motion capture elements that comprise at least one sensor configured to capture any combination of one or more values associated with an orientation, position, velocity, acceleration of said plurality of motion capture elements and wherein said mount comprises at least one electrical connection coupled with said mount configured to couple with a motion capture element of said plurality of motion capture elements;
    a computer configured to
        sample motion from said plurality of motion capture elements when said mount is moved in or about or in and about at least one axis;
        sample motion from said plurality of motion capture elements when said mount is moved in or about or in and about a second axis substantially orthogonal to said at least one axis;
        sample motion from said plurality of motion capture elements when said mount is moved in or about or in and about a third axis substantially orthogonal to said at least one axis and said second axis;
        calculate a calibration matrix for each of said plurality of motion capture elements to convert three axes motion capture data into calibrated motion capture data;
        store said calibration matrix for use with each of said plurality of motion capture elements.

20. The system of claim 19 wherein said motion element is configured to rotate about a single axis only.

* * * * *